United States Patent [19]
Feldman

[11] Patent Number: 6,154,741
[45] Date of Patent: Nov. 28, 2000

[54] ENTITLEMENT MANAGEMENT AND ACCESS CONTROL SYSTEM

[76] Inventor: Daniel J. Feldman, 93 Perry St., Brookline, Mass. 02146

[21] Appl. No.: 09/288,321

[22] Filed: Apr. 8, 1999

Related U.S. Application Data
[60] Provisional application No. 60/117,830, Jan. 29, 1999.

[51] Int. Cl.[7] .................................................. G06F 17/30
[52] U.S. Cl. ........................... 707/9; 707/3; 707/10; 709/219; 709/225; 709/229
[58] Field of Search ........................... 707/3, 9, 10, 102; 709/219, 225, 229

[56] References Cited

U.S. PATENT DOCUMENTS

| | | | |
|---|---|---|---|
| 4,606,002 | 8/1986 | Waisman et al. | 364/200 |
| 5,644,763 | 7/1997 | Roy | 395/612 |
| 5,649,181 | 7/1997 | French et al. | 395/603 |
| 5,668,987 | 9/1997 | Schneider | 395/603 |
| 5,675,771 | 10/1997 | Curley et al. | 395/500 |
| 5,696,898 | 12/1997 | Baker et al. | 713/201 |
| 5,809,230 | 9/1998 | Pereira | 713/200 |
| 5,857,188 | 1/1999 | Douglas | 707/9 |
| 5,889,952 | 3/1999 | Hunnicutt et al. | 709/219 |
| 5,893,107 | 4/1999 | Chan et al. | 707/103 |
| 5,999,978 | 12/1999 | Angal et al. | 709/229 |

OTHER PUBLICATIONS

O'Neil, Patrick and Quass, Dallan, "Improved Query Performance with Variant Indexes" SIGMOD '97 May 1997, Tucson Arizona, USA, pp. 1–12.

Rivest, Ronald L. and Lampson, Butler, "SDSI—A Simple Distributed Security Infrastructure" Laboratory for Computer Science, Massachusetts Institute of Technology (Sep. 15, 1996), pp. 1–35.

*Primary Examiner*—Jean R. Homere
*Attorney, Agent, or Firm*—Nutter, McClennen & Fish, LLP

[57] ABSTRACT

The invention provides a method, system, and computer program product for determining accessor entitlement to a resource in response to an accessor request for access to the resource. The invention associates a resource with an entitlement expression that includes a reference to at least one membership map having membership information regarding the accessor and associates with the accessor a unique identifier that acts as an index into each membership map. The entitlement expression is evaluated for the resource to determine the entitlement of the requesting accessor to the resource. The evaluation includes looking up the accessor's membership information in at least one membership map using the accessor's unique identifier. The invention may further include at least one accessor group having a name, zero or more accessors that are members of the group, and a membership map for determining whether a particular accessor is a member of the group. The entitlement expression then refers to at least one membership map by including at least one group name in the entitlement expression.

37 Claims, 12 Drawing Sheets

ENTITLEMENT MANAGEMENT AND ACCESS CONTROL SYSTEM

CROSS REFERENCE TO RELATED APPLICATION

This application claims the benefit of U.S. Provisional Application No. 60/117,830, filed on Jan. 29, 1999, and specifically incorporates the contents of that application herein by reference.

STATEMENT REGARDING FEDERALLY SPONSORED RESEARCH

Not Applicable.

FIELD OF THE INVENTION

The invention relates generally to a method and system for managing access to resources over a computer network. More particularly, the method and system for managing access utilizes entitlement expressions that refer to membership maps and unique accessor identification indices into the membership maps to determine a user's entitlement to a resource.

BACKGROUND OF THE INVENTION

As more business is done on computers, and particularly as more business is done and information is exchanged across computer networks, access controls for determining which computer users and software applications may obtain access to which data or other computerized resources across these computer networks becomes increasingly important. Access controls, for example, can control access to pages on the World Wide Web, allowing differential content to be provided to different groups of people, whether they are paying customers who pay for differing levels of access, or to different groups of people who may have rights to differing levels of confidential information. Access controls can also provide differing levels of database access and transaction authorization as well as controlling the flow of information that is broadcast or "pushed" over a computer network such as in electronic publishing and message forwarding.

Traditional systems for managing access to system resources typically use archaic syntax to specify recipients who are entitled to use of or access to information or other resources in a computer system. Reprogramming these systems to adapt to new conditions, such as new levels of access or new groups to whom access is granted, is cumbersome. The need to learn a particular syntax also results in time consuming training and "trial and error" periods for new users of these systems to learn how to use the systems efficiently.

Other systems utilize access control lists (ACLs). In general, ACLs associate names and lists of names with objects for access purposes. In general, inclusion on a list or a list specified in some other list constitutes entitlement. This style of entitlement requires complex list administration in order to represent complex conditions of entitlement, conditions, for instance, where a user characteristic is superceded by some other characteristic.

One problem with access control lists is that they can only represent simple entitlement rules and the ACL approach typically does not allow use of arbitrary functions or conditions when specifying access to or control of a resource. Accordingly, ACLs are not rich enough for sophisticated applications. Access control list systems also cause server performance to degrade when the numbers of users or objects or lists become large, requiring multiple time consuming database select and join operations to be performed serially in order to determine access entitlements. As sites on the World Wide Web become more complex and attract more users, all expecting prompt service from the Web site, the problem of determining user entitlement to an object becomes more acute.

In addition, ACLs generally are not available in encapsulated (object-oriented) implementations, making implementation and maintenance of the ACL software difficult. For these and other reasons, ACL implementations are typically specific to platform operating system or web server implementations.

It would, therefore, be desirable to provide a system that can arbitrate access to particular resources in a system while avoiding or mitigating the problems of prior art systems. Such a system would preferably improve performance where the number of users is large, possibly by requiring only simple database operations that can be performed in parallel. The system should also allow for simple maintenance and update of databases containing access information while at the same time utilizing plain text message entitlement rules and allowing arbitrary functions or conditions to specify access to or control of a resource. The system should also be available in an encapsulated format that is readily deployable on any of a single computer, special purpose embedded applications, a wide or local area network, intranets, the Internet or other networks or systems where user entitlement to resources must be determined.

SUMMARY OF THE INVENTION

The invention described herein provides a platform independent, fast, scalable and standards compliant entitlement manager that enables the practical implementation of sophisticated, personalized access control. With the entitlement management system of the invention, simple expressive representations of complex entitlement rules are provided in an easy to administer format. The efficient data structures and techniques used result in high performance even with large numbers of objects, users and lists and the scalable algorithms and techniques of the system provide built-in support for growth. The invention also provides accessor, accessor group and object registry builder tools that are easy to set up and allow for ongoing maintenance.

A method according to the invention, applied in a system having a plurality of accessors desiring access to one or more resources and at least one resource, determines accessor entitlement to a resource in response to an accessor request for access to that resource. The method includes associating an entitlement expression with the resource, and associating a unique identifier with the accessor. The entitlement expression includes a reference to at least one membership map having membership information for the accessor, and the accessor's unique identifier acts as an index into the membership maps. The method includes evaluating the entitlement expression for the resource to determine the entitlement of the requesting accessor to the resource where the evaluation includes looking up the accessor's membership information in the at least one membership map referred to in the entitlement expression using the accessor's unique identifier.

The system may further include at least one accessor group where each group has a name, zero or more accessors that are members of the group, and a membership map for determining whether a particular accessor is a member of the group. The entitlement expression then references at least one membership map by including at least one group name corresponding to a group having a membership map in the entitlement expression. The entitlement expression may also include more than one group name, and may include operators such as boolean operators, for example, for operating on the group names to evaluate an entitlement request. For example, such an entitlement expression might be "all U.S. citizens minus males under the age of 25," where "all U.S. citizens" and "males under the age of 25" are groups of accessors and "minus" is an operator. In evaluating this entitlement expression for an accessor, the system uses the accessor's identifier as an index into membership maps to determine whether the accessor is a member of either of the two groups, then evaluates the expression to determine whether the accessor meets the entitlement requirements.

In one embodiment, each membership map is a bit map and the accessor's unique identifier is an index to a position in each bit map wherein the bit at that position indicates whether the accessor is a member of the group corresponding to the bit map. The membership bit maps can be conveniently stored in paged data structures.

The invention also includes a system for determining accessor entitlement to a resource having a first means for storing a plurality of accessors and a unique identifier associated with each accessor and a second means for storing a plurality of unique accessor group names. Each of the plurality of accessor group names has an associated membership map with the accessor identifier acting as an index into the accessor group membership maps for determining whether an accessor is a member of an accessor group. The system further includes a processor means for determining whether an accessor is entitled to a resource in response to an accessor request for the resource by evaluating an entitlement expression for the resource wherein the entitlement expression include a reference to at least one accessor group. The system may also have a third means for storing at least one unique resource name corresponding to a resource and an entitlement expression associated with each resource name.

The system may be implemented as a server process responsive to one or more client processes representing accessor requests for access to a resource. In one embodiment, the processor means may be implemented as a plurality of threads executing on a server computer for accessing the first and second means and for evaluating accessor entitlement requests based on information retrieved from the first and second means.

The entitlement manager system of the invention provides a new approach to access control in complex systems and provides a dramatic advance over access control lists by providing high speed resolution of dynamic access control rules. The entitlement manager system thereby enables reliable charging of fees for content or services in new ways without driving readers away by evaluating a user characteristic at run time to determine entitlement to the content or services in real time.

The system of the invention can be provided in a portable implementation and thus a user can preserve his or her investment in the system even as deployment or application of the system changes. The system also provides support for common distributed object models which allows for easy integration into a wide variety of operating environments. The entitlement manager system can further be made available as middleware and as webware and can be implemented as an embedded component for managing access to any object. In short, the entitlement manager system of the invention can be deployed anywhere that a system needs an answer to the question, "Is this user allowed access to this object?"

BRIEF DESCRIPTION OF THE DRAWINGS

The foregoing features of this invention as well as the invention itself may be more fully understood from the following detailed description of the drawings, in which.

DETAILED DESCRIPTION OF THE INVENTION

The following description sets forth an exemplary embodiment, in accordance with the present invention, of an entitlement management system which manages access to resources in a system. Such a system can be used for a variety of purposes including but not limited to electronic publishing, message forwarding, transaction authorization, database access.

Figure 1:
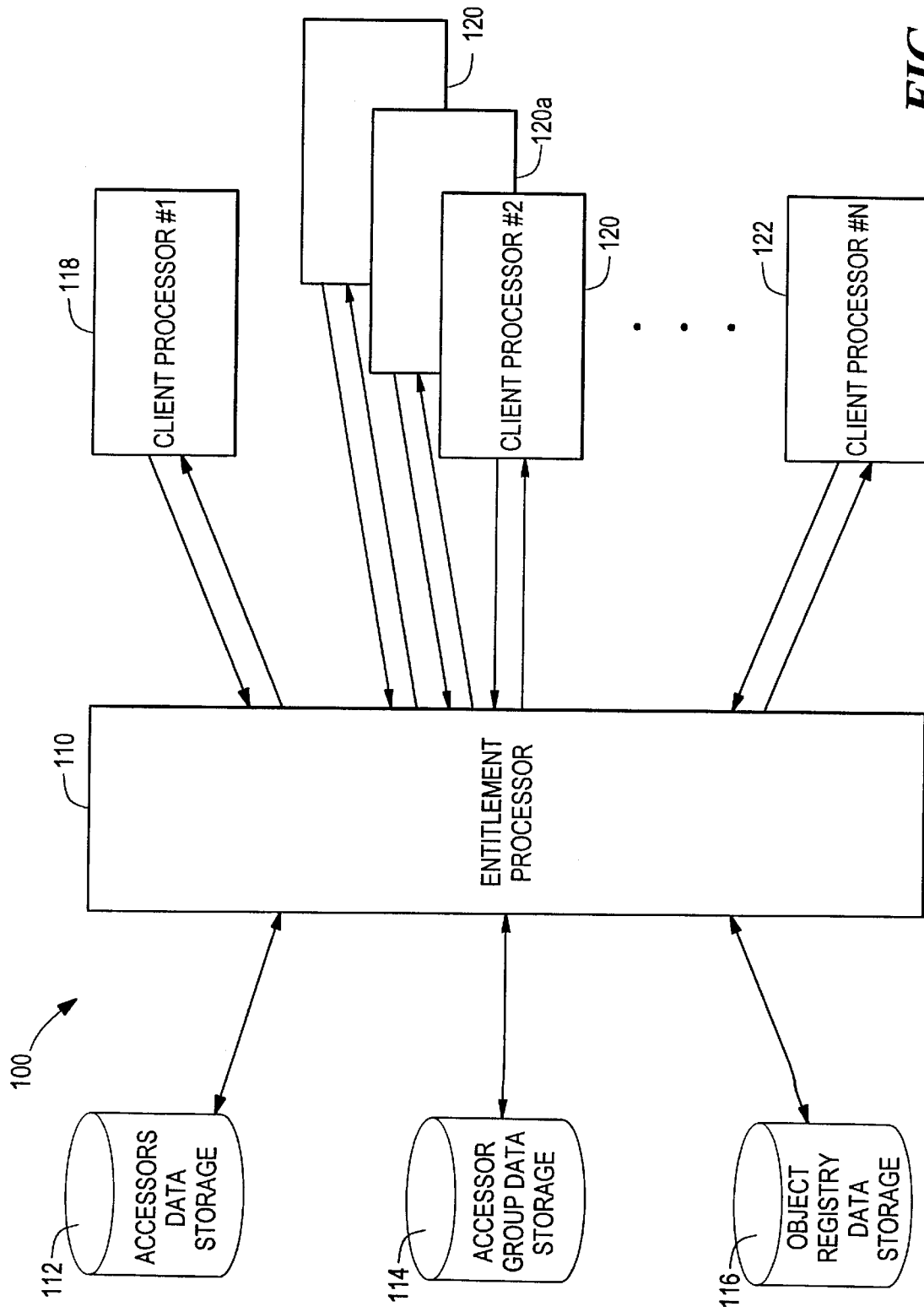
FIG. 1 is a block diagram of an entitlement system.

Referring now to FIG. 1, an exemplary entitlement manager system 100 includes an entitlement processor 110 which receives data from and provides data to an accessor data storage 112, an accessor group data storage 114 and an object registry data storage 116. As used herein "accessors" are entities which request access to, and are generally entitled to some kind of access to, objects or resources in the system. An "accessor group" refers to a named collection or group of accessors. An "object registry" (OR) includes individual resources, each resource uniquely identified and associated with an "entitlement expression." An "entitlement expression" is a specification of access entitlement and generally includes a reference to at least one accessor group, and may further include a plurality of references to accessor groups and one or more operators which can, for example, be boolean type operators. In addition, function names can be used as operators, allowing for custom operations to be performed.

Each of the data storage devices 112–116 may be provided, for example, as a database, into which information for arbitrating systems resources is stored. Each of the data storage devices 112–116 may also be combined in a single entitlement database. In addition, accessor data storage 112 can be a specialized database known as a directory service such as LDAP, NDIS, NDS, YP, x.500, etc. The entitlement processor 110 retrieves information as appropriate and provides information to and receives information from a plurality of client processes 118–122. Entitlement processor 110 may also be implemented in a multithreaded manner, and the threads on which it executes may be selected from pools of waiting threads. For example, the entitlement processor 110 may maintain open data base threads to access stores 112–116. Alternatively, entitlement processor 110 can obtain open threads from a pool of threads into one or more databases to access stores 112–116. Entitlement processor 110 may also access the stores 112–116 in a parallel fashion to increase speed.

The accessor data storage 112 contains a listing or other information which describes persons or software applications or objects that can potentially can have access to information or resources available on the system. The accessor group data storage 114 includes lists of named groups which are associated with membership maps. In a manner to be described further in detail below, the named groups are used to specify which accessors have access to which information. There is generally a one-to-one correspondence between each addressable membership information slot in the membership map and each accessor in the accessors data storage.

The object registry data storage 116 includes an object or resource identifier and an entitlement expression (E-expression). The E-expression is evaluated by the entitlement processor to determine which accessors have access to which information and resources. The entitlement expressions can include accessor names and accessor group names. For example, one group name could be all U.S. citizens; this group would include all accessors who are U.S. citizens. A second group name could be "all males under age 25" and this would have a second, different associated membership map. A proper E-expression could be "all U.S. citizens minus all males under age 25." Thus, the result of the E-expression would provide access to particular resources to all U.S. citizens who are not males under the age of 25. The E-expression may also include individual accessor names, such as "all U.S. citizens minus John Smith and Jane Doe."

The entitlement processor 110 executes an entitlement manager process. The entitlement manager process corresponds to one or more execution threads serving entitlement manager requests from other processes. For example, the other processes could correspond to client processes 118, 122 or multi-threaded client processes 120. The client processes 118–122 request entitlement arbitration services from the entitlement manager 100. The entitlement manager process could be executed in a client processor or in any other processor (e.g., as server processor) as long as the entitlement manager process has access to the appropriate data structures 112–116.

Figure 2:
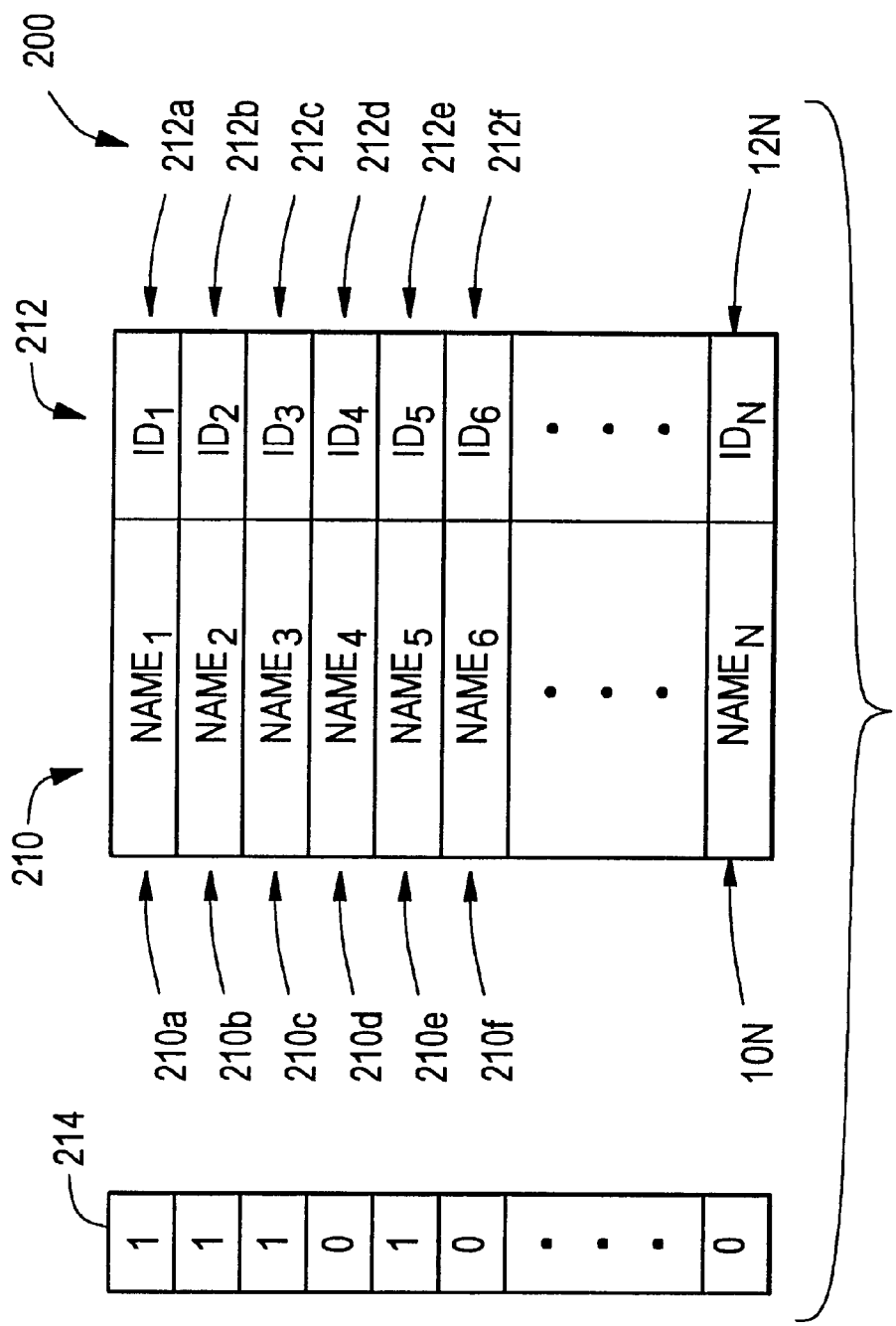
FIG. 2 is an example of a data structure for an accessor data store.
Figure 3:
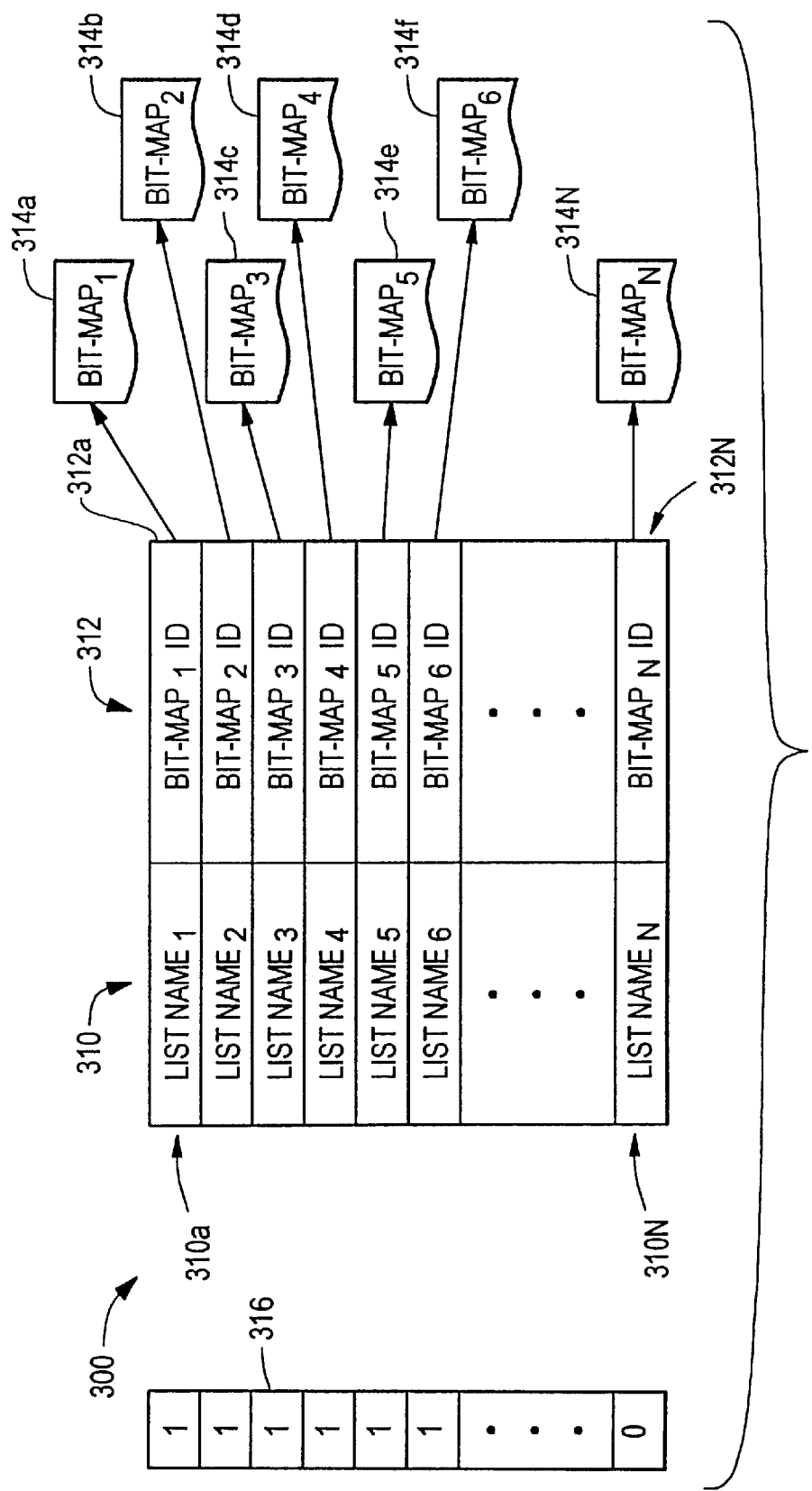
FIG. 3 is an example of a data structure for an accessor group data store.
Figure 4:
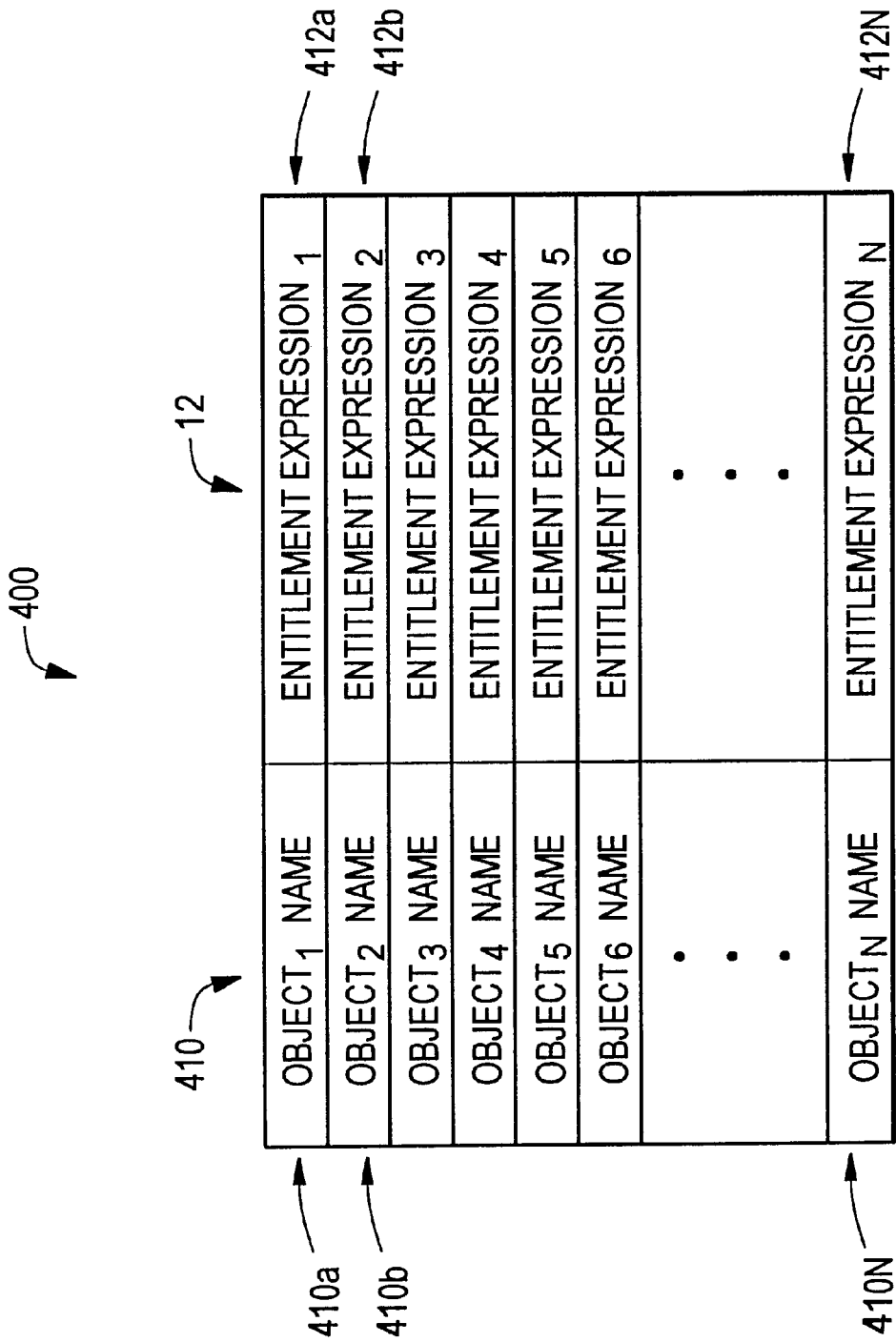
FIG. 4 is an example of a data structure for an object registry data store.

FIGS. 2–4 illustrate a set of entitlement manager data structures. Those of ordinary skill in the art will appreciate, of course, that other data structures could be used to implement the membership map solution to the entitlement problem provided by the present invention.

Referring now to FIG. 2, an accessors data store 200 includes a plurality of accessor names 210 with corresponding identification numbers (ID's) 212. The names 210 are keys into the accessors data store 200 and the ID's 212 are used as indexes into accessor group membership maps. In one embodiment, the system stores an accessor ID availability bit map 214 which is associated with the list of accessors 210. The bit map 214 includes a bit for each available identification number. The bits associated with the identification numbers which are currently assigned to accessors are ones and the bits associated with identification numbers which are not assigned are zeros.

Referring now to FIG. 3, an accessor group data store 300 includes a plurality of accessor group names 310 and the accessor group data store 300 associates those accessor group names 310 with accessor group membership maps 314. In the embodiment shown in FIG. 3, the accessor group data store 300 associates each accessor group name 310 with a membership map identification number (MMID) 312. The list names 310 are keys into the accessor group data store and the MMID's 312 identify or address membership maps 314 that represent whether individual accessors are members of the accessor groups.

A membership map 314 can be any data structure organized so that the membership information for a particular accessor 210 can be addressed by that accessor's accessor ID 212. In one preferred embodiment, the membership map 314 is a bit map having one bit for each accessor 210 in the accessor store 200. For example, if a particular accessor 210 has an accessor ID of, say, 17, the $17^{th}$ bit in each membership bit map 314 will be set to one if that accessor is a member of that accessor group. The $17^{th}$ bit will be set to zero for each membership bit map where the accessor is not a member of the accessor group.

In one embodiment, the system stores an MMID availability bit map 316 which is associated with the list of accessor group names 310. The bit map 316 includes a bit for each available membership map identification number. The bits associated with membership map identification numbers which are currently assigned to accessor group names are ones. The bits associated with bit map identification numbers which are not assigned are zeros. The MMID availability bit map can be used to assign the first available MMID to new accessor groups as needed.

Referring now to FIG. 4, an object registry data store 400 includes a plurality of object names 410 and a corresponding plurality of entitlement expressions 412 which describe the entitlement access to the associated object or resource. The object names 410 are keys into the object registry data store.

Figure 5:
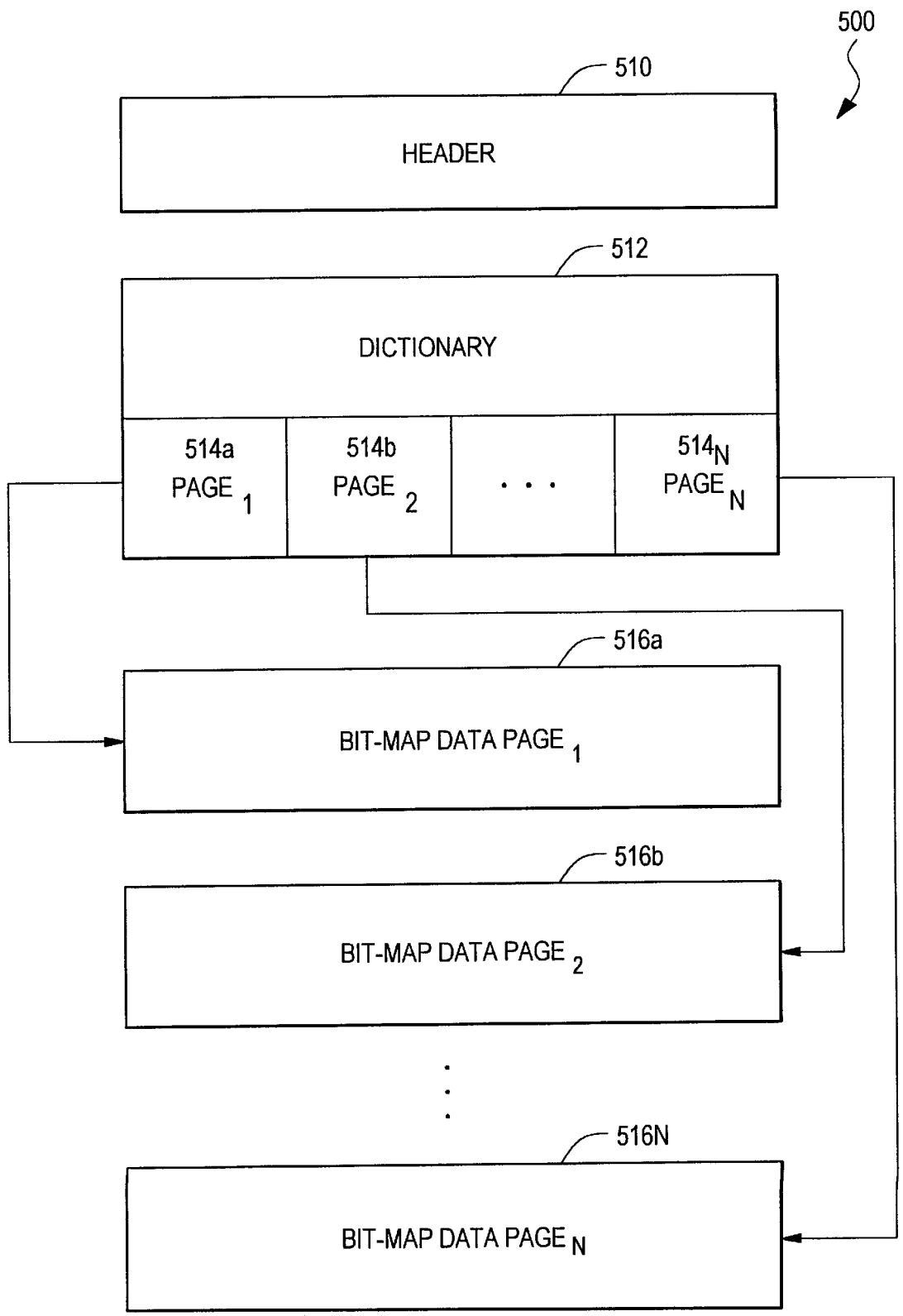
FIG. 5 is an example of a data structure for a page segmented bit map.

One entitlement manager data structure 500 for storing membership bit maps 314 is shown in FIG. 5. In this example, the entitlement manager data structure is shown as a page segmented bit map data structure 500. The data structure includes a header 510 which includes miscellaneous descriptive information, a dictionary 512 which holds a table of bit map data page offsets and the bit map data for a number of different pages 516 (bit-map data page 1, bit-map data page 2, etc . . . ).

The information stored in a single bit map is divided into several pages to increase the speed of the system. The system stores a predetermined number of bits on each page. When determining whether a particular bit is set to "one," the system goes directly to the page including that particular bit. This process is more efficient than starting at the first bit and indexing through all the bits until the desired bit is located. In one embodiment, the system also identifies whether the bits on a particular page are all zeros, all ones or are a combination of zeros and ones. In this embodiment, the system only needs to evaluate a particular bit when the page indicates it contains mixed values.

The operation of the entitlement manager system 100 is next described by reference to FIGS. 1 to 4. Entitlement verification requests arrive at the entitlement manager 100 server process in response to client processes 118–122 wishing to access resources. An entitlement verification request generally includes two identifiers: an accessor name or identification representing the identity of the accessor who wishes access to a resource; and an object name or ID representing the identity of the resource that the accessor wishes to access. The entitlement manager 100 queries the accessors table 200 using the requesting accessor's name 210 to determine the accessor's ID 212. The accessor's ID 212 is then used as an index into a bit position in the accessor group membership bit maps 314.

In an exemplary embodiment, each bit map 314 includes a number of bit fields that is at least as great as the number of names 210 in the accessors table 200. The accessor's ID 212 may then be a number that represents the position of that Accessor's bit in each bit map 314. An example is provided in Table 1. If an accessor who queries the system is identified in the accessors table 200 as having an ID 212 value of 3, that ID value acts as an index into the list name bit maps 314 as the third bit in each bit map.

For the example, and making reference to Table 1, an accessor having an ID of 3 is identified as belonging to the lists of "All Subscribers," "US Subscribers," and "Male." The accessor having an ID of 3 does not belong to the lists "Physical Therapists," "Medical Doctors," "Female," or "Gender Unknown."

TABLE 1

| List Name ↓\ID Number → | 1 | 2 | 3 | 4 | 5 |
|---|---|---|---|---|---|
| All Subscribers | 1 | 1 | 1 | 1 | 1 |
| Physical Therapists | 0 | 0 | 0 | 1 | 0 |
| US Subscribers | 1 | 1 | 1 | 1 | 0 |
| Medical Doctors | 1 | 0 | 0 | 0 | 1 |
| Male | 1 | 0 | 1 | 0 | 0 |
| Female | 0 | 1 | 0 | 1 | 0 |
| Gender Unknown | 0 | 0 | 0 | 0 | 1 |

The object registry 400 is queried using the object name 410 to retrieve that object's E-expression 412. The E-expression is parsed, or is stored in a pre-parsed form, and evaluated to yield a final bit value for the accessor. The E-expression may include accessor group names 310 that are allowed or not allowed access to particular resources. Continuing with the example described by reference to Table 1, the resources may be World Wide Web pages and members of different groups identified by the list names 310 may be allowed access to certain Web pages and not allowed access to other Web pages.

An example object registry 400 is provided in Table 2.

TABLE 2

| Object Name | E-expression |
|---|---|
| Web Page 1 | All Subscribers |
| Web Page 2 | All Subscribers but not Physical Therapists |
| Web Page 3 | All Subscribers but not US Subscribers |
| Web Page 4 | Medical Doctors |

Operating on the accessor's bit value in each accessor group specified in the E-expression, and then combining the individual values according to the operators in the E-expression yields a final adjudication of the validity of the requested access. If our example accessor having an accessor ID 212 of 3 tries to access the resource having the object name 310 "Web Page 3," entitlement processor 110 first checks the accessor's "All Subscribers" bit map for the value of bit 3 and finds that the accessor is a member of this group. The entitlement processor 110 also checks the "US Subscribers" bit map for the value of bit 3 and finds that the accessor is a member of this group and denies access to Web Page 3 to this accessor based on the "not" operator in the E-expression.

Where the E-expression includes more than one accessor name or accessor group name, the E-expression can include operators that act to combine the names. Exemplary operators can include boolean operators, however, any useful operator for combining Accessors or groups of accessors may be defined in the system of the invention by a person of ordinary skill in the art.

The system of the invention advantageously allows E-expressions to be stored in a way that is readily readable and usable by system operators. Accordingly, E-expressions need not always be stored in an object registry, but can be associated with objects at run time by prompting a system operator enter an E-expression, for example by way of an E-expression entry GUI, at some appropriate time when an E-expression is needed to define entitlement to an object.

FIGS. 6–9 are a series of flow diagrams showing data maintenance processing performed by a processing apparatus which may, for example, be provided as part of the entitlement processor system such as that shown in FIG. 1, to allow users to access resources within a system. The rectangular elements in the flow diagram(s) are herein denoted "processing blocks" and represent computer software instructions or groups of instructions. The diamond shaped elements in the flow diagrams are herein denoted "decision blocks" and represent computer software instructions or groups of instructions which affect the processing of the processing blocks.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrates the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention.

Figure 6:
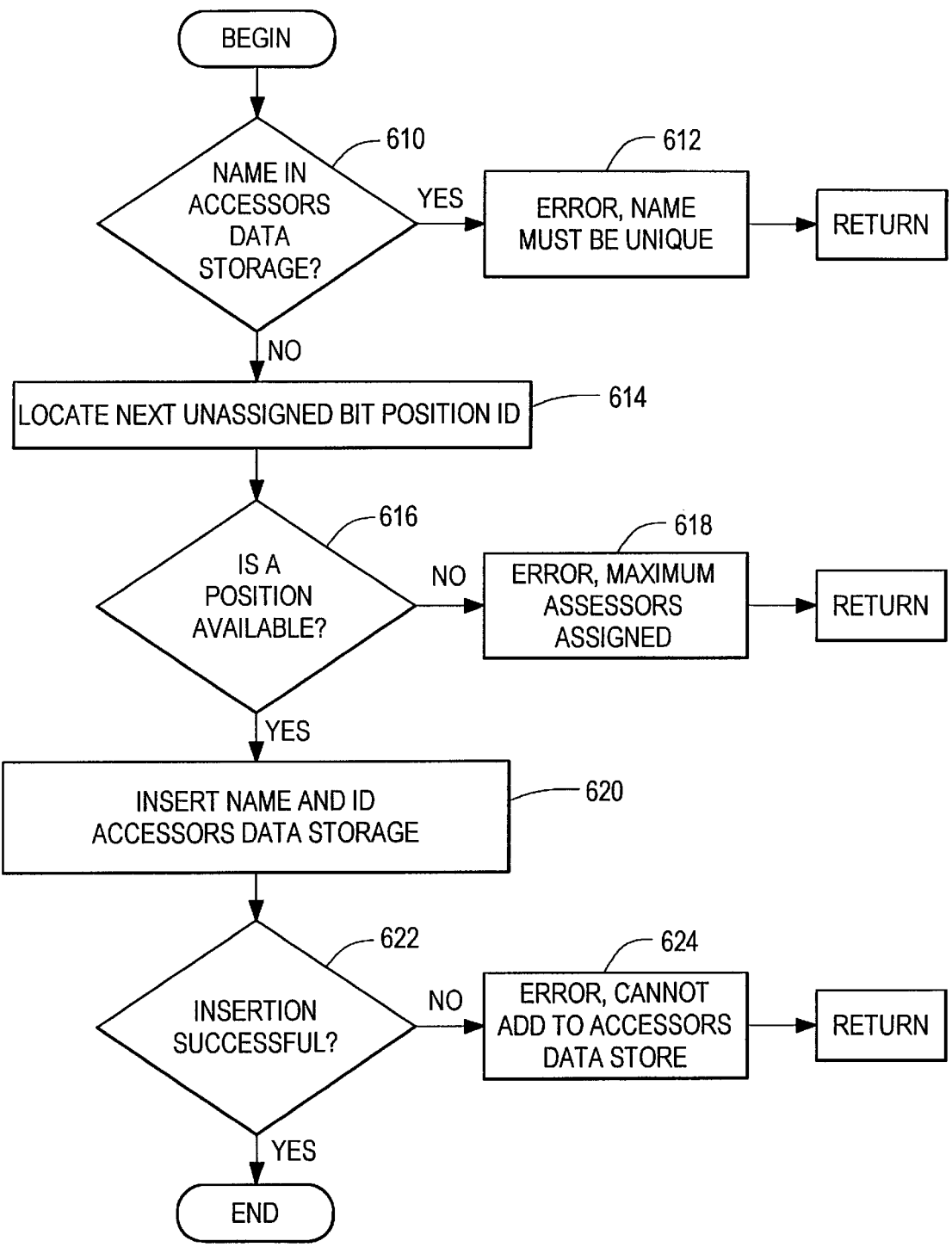
FIG. 6 is a flow diagram which illustrates a technique for adding an accessor.

A procedure for adding new accessors to the accessor table 200, as illustrated in FIG. 6, begins in step 610 where a determination is made as to whether a name 210 in an accessors data storage already exists. If the name already exists, then processing flows to block 612 where an error signal/condition is generated since each name must be unique. Processing then ends or returns to the start. If in step 612 a decision is made that the name is not already in the accessors data storage, then processing flows to block 614 where the next unassigned accessor ID 212 is located.

In order to determine which identification number should be assigned to a new accessor, the system keeps track of which identification numbers are currently assigned to accessors. As mentioned above in conjunction with FIG. 2, in one embodiment, the system stores a bit map 214 which is associated with the list of accessors 210. The bit map 214 includes a bit for each available identification number. The bits associated with the identification numbers which are currently assigned to accessors are ones and the bits associated with identification numbers which are not assigned are zeros. The system begins at the bit associated with the first identification number $ID_1$ 212a and searches for the first bit which is a zero. In one embodiment, the identification number of a person who was once an accessor, but who is no longer an accessor, may be reassigned. In this embodiment, when a person is removed from the list of accessors 210, the bit in the bit map associated with that person's identification number is changed to a zero. When the system searches for the first identification number which is not assigned to an accessor, this zero bit identifies the removed accessor's identification number as being available.

If a bit map position or ID number is not available (decision block 616), then the processing flows to block 618 where an error signal/indicator is generated because the maximum number of accessors has been assigned. If in decision block 616 a decision is made that a position is available, then the name 210 and identifier 212 are inserted into the accessors data storage as shown in block 620. Processing then flows to decision block 622 where a determination is made as to whether the insertion is successful. If decision is made that the insertion is not successful, then processing flows to block 624 where an error/condition signal is generated to indicate that the names cannot be added to the accessors data store. If in decision block 622 decision is made that the insertion was successful, then processing ends.

Figure 7:
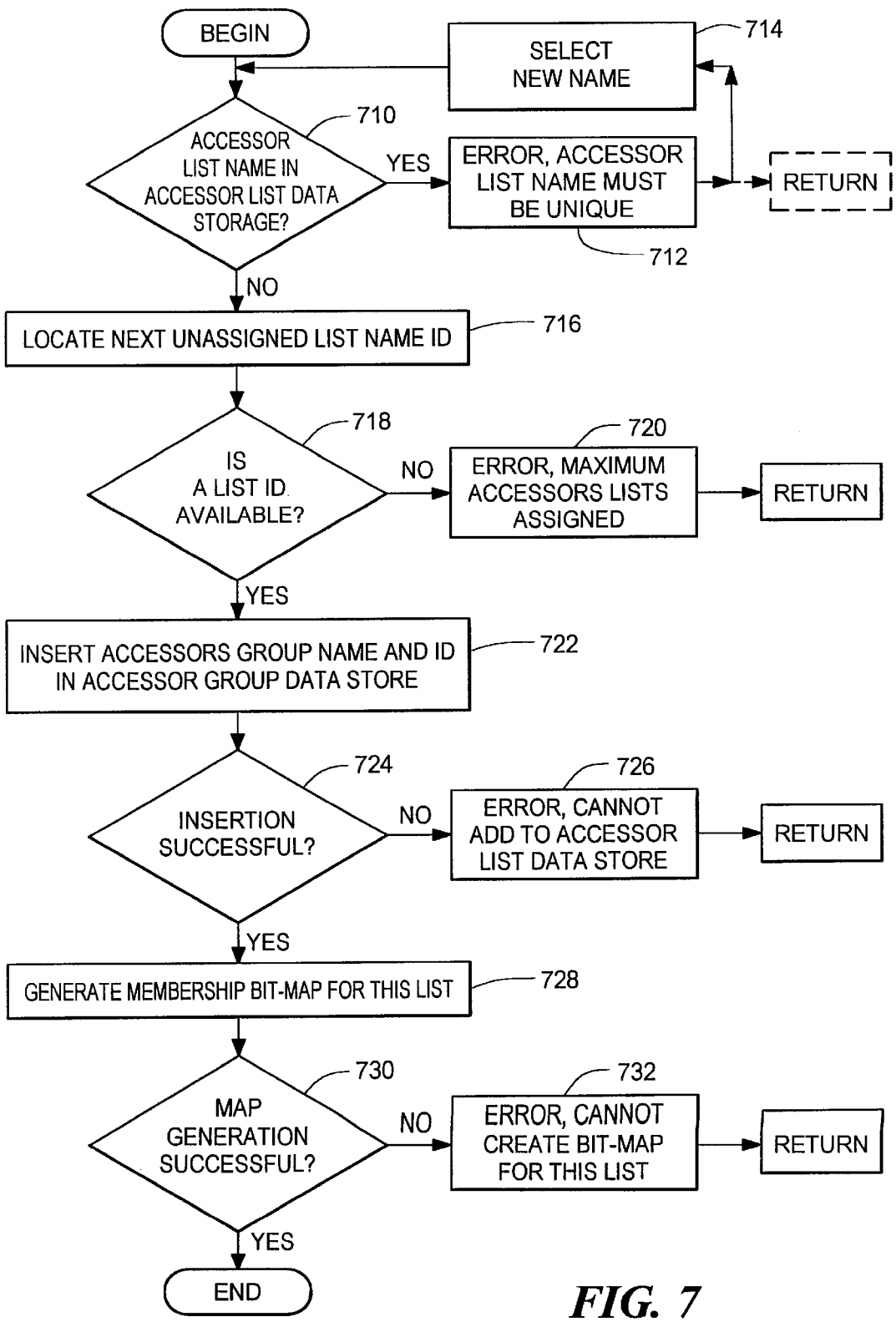
FIG. 7 is a flow diagram which illustrates a technique for adding an accessor group.

Referring now to FIG. 7, accessor group name 310 maintenance processing for adding a new accessor group name begins in decision block 710 where a determination is made as to whether an accessor group name already exists in an accessor group data storage. If the name does exist, then processing flows to step 712 where an error signal or condition is generated since each accessor group name must be unique. Processing then proceeds to block 714 where a new accessors group name is selected. This loop is repeated until a new accessors group name is selected. Once a new accessors group name is selected, processing proceeds to block 716 where a next unassigned list name and ID are located. Processing then flows to block 718 where a determination is made as to whether an accessors group membership map identification is available. If no identification is available, then processing proceeds to block 720 where an error signal or condition is generated due to the maximum accessors list already being assigned. Processing then ends or returns.

Similar to the process of assigning identification numbers to new accessors, the system keeps track of which membership map identification numbers are currently assigned to accessor group names. As mentioned above, in one embodiment, the system stores a bit map 316 which is associated with the list of accessor group names 310. The bit map 316 includes a bit for each available bit map identification number. The bits associated with bit map identification numbers which are currently assigned to accessor group names are ones. The bits associated with bit map identification numbers which are not assigned are zeros. The system begins at the bit associated with the first bit map identification number $BIT-MAP_1$ ID 312a and searches for the first bit which is a zero. In one embodiment, the bit map identification number of an accessor group name which has been removed from the system may be reassigned. In this embodiment, when an accessor group name is removed, the bit in the bit map associated with that accessor group name's identification number is changed to a zero. When the system searches for the first bit map identification number which is not assigned to an accessor group name, this zero bit identifies the removed accessor group name's bit map identification number as being available.

If a membership map ID 312 is available, then processing flows to block 722 where the accessor group name 310 and membership map ID 312 are inserted into an accessor group data store. Processing then flows to decision block 724 where a determination is made as to whether the insertion was successful. If the insertion was not successful, then processing flows to block 726 where an error signal/condition is generated due to the inability to add to the accessor group data store. Processing then ends or returns as shown. If the insertion is successful, then processing flows to block 728 where a membership map 314 for this list is generated. Processing then flows to block 730 where a determination is made as to whether the membership map generation was successful. If the map generation was successful, then processing ends. If the map generation was not successful, then processing flows to block 732 where an error signal/condition is generated to indicate that a bit map for this list cannot be generated. Processing then ends as shown.

Figure 8:
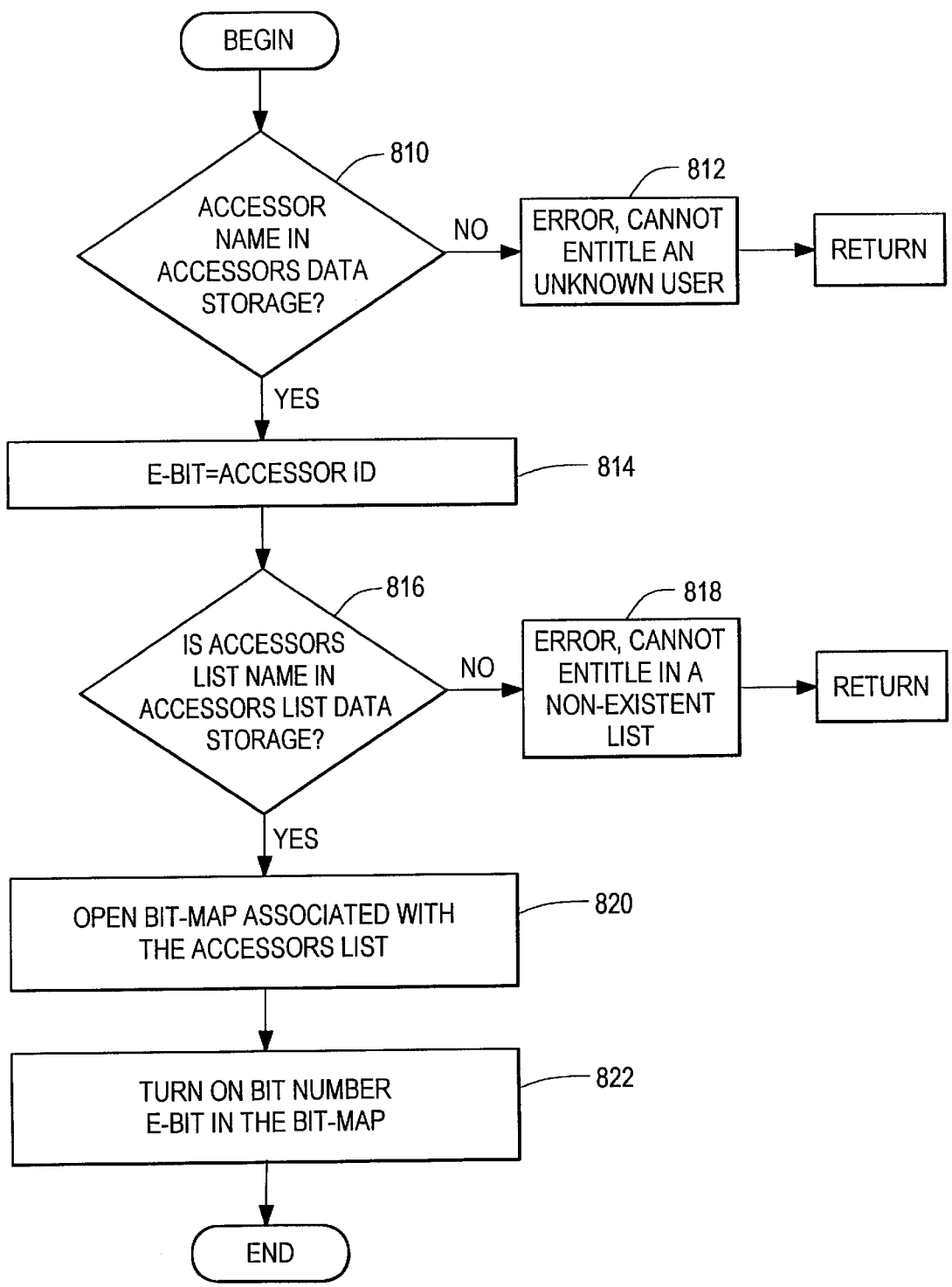
FIG. 8 is a flow diagram which illustrates a technique for adding an accessor to an accessor group.

Referring now to FIG. 8, a flow diagram which shows the entitlement manager processing flow to add an accessor to the accessor group is shown. It should be noted that the input parameters for the entitlement manager process flow includes the accessor name and the accessor group name.

Processing begins in block 810 where it is determined whether an accessor name 210 is in the accessors data storage. If the accessor's name 210 is not in the accessors data storage, then processing flows to block 812 where an error signal/condition is generated indicating that an entitlement cannot be given to an unknown user. If in decision block 810 decision is made that the accessor name is in the accessors data storage, then processing flows to block 810 where an ebit is equal to the accessor identifier. Processing then flows to decision block 86 where decision is made as to whether the accessor group name 310 is in the accessors list data storage. If a decision is made that the group name is not in the data storage, then processing flows to block 88 where an error signal/condition is generated indicating that entitlement cannot be given to a nonexistent list. If, on the other hand, the accessor group name 310 is in the accessor group data storage, then processing flows to block 820 where a bit map associated with the accessor group is opened or accessed. Processing then flows to block 822 where the appropriate bit number corresponding to the accessor's ID 212 in the bit map 314 is set to a predetermined value. Processing then ends.

Figure 9:
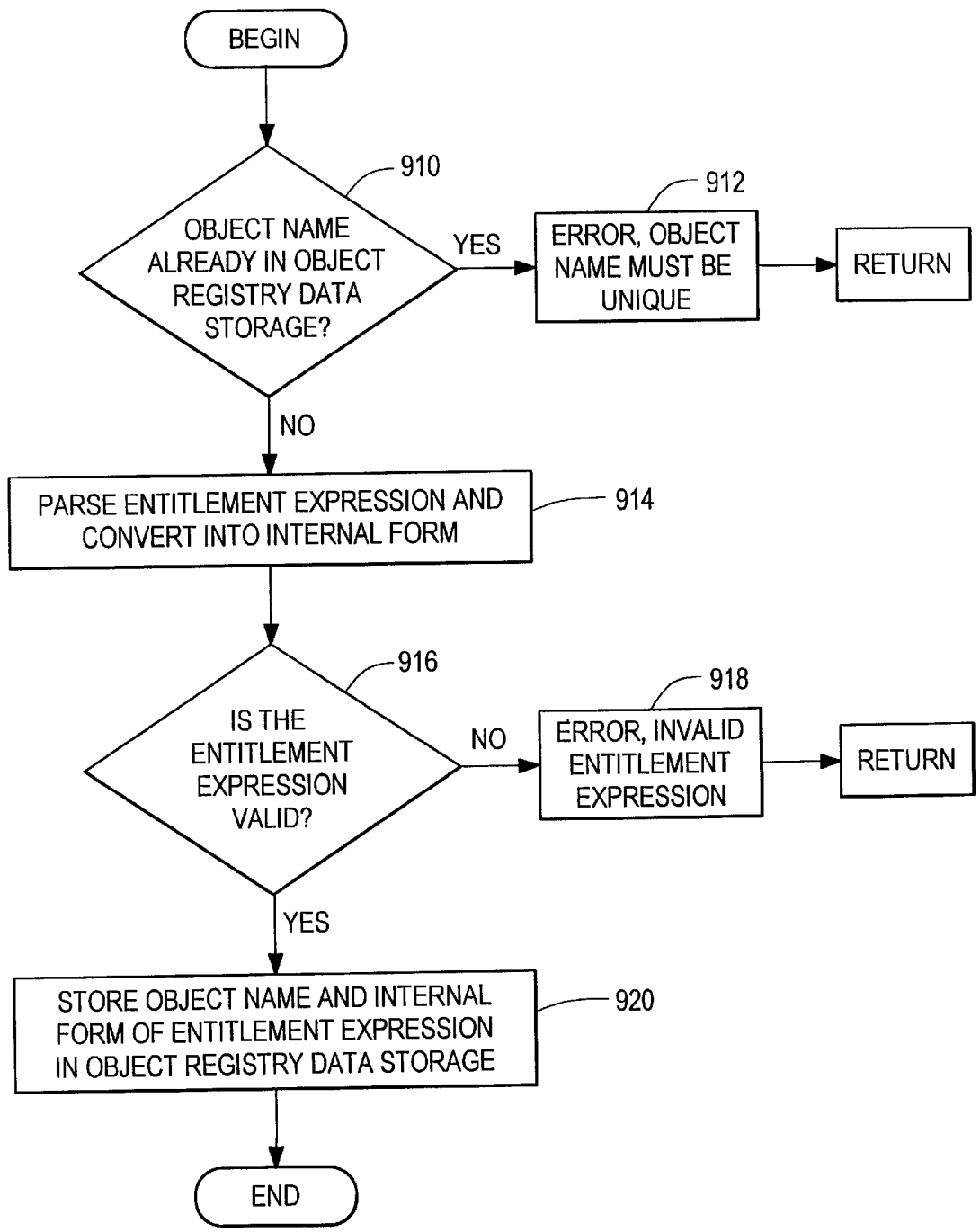
FIG. 9 is a flow diagram which illustrates a technique for adding an object to and object registry.

Referring now to FIG. 9, the entitlement manager process flow to add an object to the object registry 400 is shown. Before describing the process flow, it should be noted that the input parameters for the process flow include the object name 410 and an entitlement expression 412 (E-expression). Processing begins in decision block 910 where a decision is made as to whether a particular object name 410 is already in the object registry data storage. If the particular name is already in the storage, then processing flows to block 912 where an error signal/condition is generated since the object name must be unique.

If, on the other hand, it is determined that the object name 410 is not already in the object registry data storage, then processing flows to block 914 where the entitlement expression 412 may be parsed and converted into a particular internal form. Processing then flows to decision block 916 where a determination is made as to whether the entitlement expression is valid. If it is found that the entitlement expression is not valid, then processing flows to block 918 where an error signal/condition is generated to indicate that an invalid entitlement expression has been provided. If, on the other hand, in decision block 916 determination is made that the entitlement expression is valid, then processing flows to block 920 where the object name and the internal form of the entitlement expression 412 are stored in the object registry data storage. Processing then ends as shown.

Figure 10:
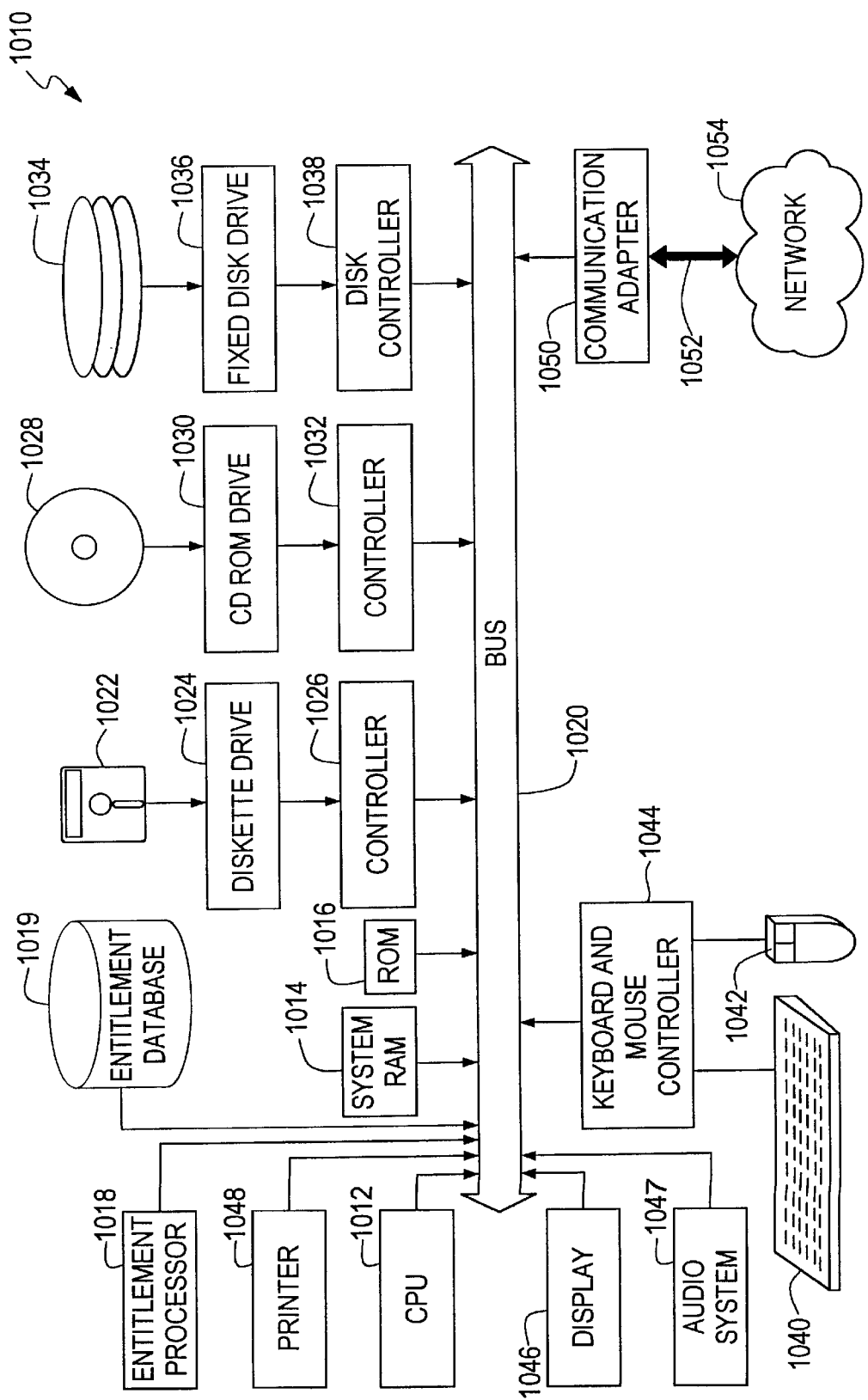
FIG. 10 illustrates a computer system on which the invention may be implemented and utilized.

Referring now to FIG. 10, a computer system 1010 on which the invention may be implemented is shown. Computer system 1010 may be provided, for example, as a work station, an IBM compatible computer or any other equivalent computer system. The exemplary computer system 1010 of FIG. 10 is for descriptive purposes only. Although the description may refer to terms commonly used in describing particular computer systems, the description and concepts equally apply to other processing systems, including systems having architectures dissimilar to that shown in FIG. 10.

Computer system 1010 includes a central processing unit (CPU) 1012, which may be provided, for example, as a conventional microprocessor, a random access memory (RAM) 1014 for temporary storage of information, and a read only memory (ROM) 1016 for permanent storage of information. Computer system 1010 may also include a display 1046, an audio system 1047 and an entitlement processor 1018. Each of the aforementioned components are coupled to a bus 1020. Operation of computer system 1010 is generally controlled and coordinated by operating system software. The operating system controls allocation of system resources and performs tasks such as processing, scheduling, memory management, networking, and I/O services, among things. Thus, an operating system resident in system memory and executed by CPU 1012 coordinates the operation of the other elements of computer system 1010.

Also coupled to bus 1020 is a non-volatile mass storage device which may be provided as a diskette 1022. Diskette 1022 is insertable into a diskette drive 1024 which is, in turn, coupled to bus 1020 by a controller 1026. Similarly, a compact disc (CD) ROM 1028 is insertable into a CD ROM drive 1030 which is, in turn, coupled to bus 1020 by a controller 1032. A hard disk 1034 is typically provided as part of a fixed disk drive 1036 which is coupled to bus 1020 by a disk controller 1038.

Data and software may be provided to and extracted from computer system 1010 via removable storage media such as diskette 1022 and CD ROM 1028. For example, values and expressions generated using techniques to be described above in conjunction with FIGS. 6–9 may be stored on storage media similar to media 1022, 1028. The data values may then be retrieved from the media 1022, 1028 by CPU 1012 and utilized by CPU 1012 to perform color printing of scanned or stored mixed color documents. Alternatively, CPU 1012 may simply store such data values in ROM 1016.

Alternatively still, computer software may be stored on storage media similar to media 1022, 1028. Such computer software may be retrieved from media 1022, 1028 for immediate execution by CPU 1012 or by other processors included in one or more peripherals of computer system 1010 such as display 1046 or audio system 1047. CPU 1012 may retrieve the computer software and subsequently store the software in RAM 1014 or ROM 1016 for later execution.

User input to computer system 1010 may be provided by a number of devices. For example, a keyboard 1040 and a mouse 1042 are coupled to bus 1020 by a controller 1044.

Computer system 1010 also includes a communications adapter 1050 which allows the system to be interconnected to a local area network (LAN) or a wide area network (WAN), schematically illustrated by bus 1052 and network 1054. Thus, data and computer program software can be transferred to and from computer system 1010 via adapter 1050, bus 1052 and network 1054.

An entitlement processor 1018 of the invention may be provided in a computer system by implementing the logic of the entitlement processor in a special purpose processor or application specific integrated circuit (ASIC) that communicates with CPU 1012 and data storage units 1022, 1028 and 1034 and network 1054 generally as shown in FIG. 10. Alternatively, entitlement processor 1018 may be implemented in software stored on system 1010 as described above and executed by CPU 1012. Entitlement database 1019 maybe placed in communication with system 1010 directly through the system bus 1020 as illustrated, it may communicate with system 1010 through network 1054, or entitlement database 1019 data may be stored directly onto data storage units 1022, 1028 and 1034 and accessed by CPU 1012 or entitlement processor 1018 as required.

Figure 11:
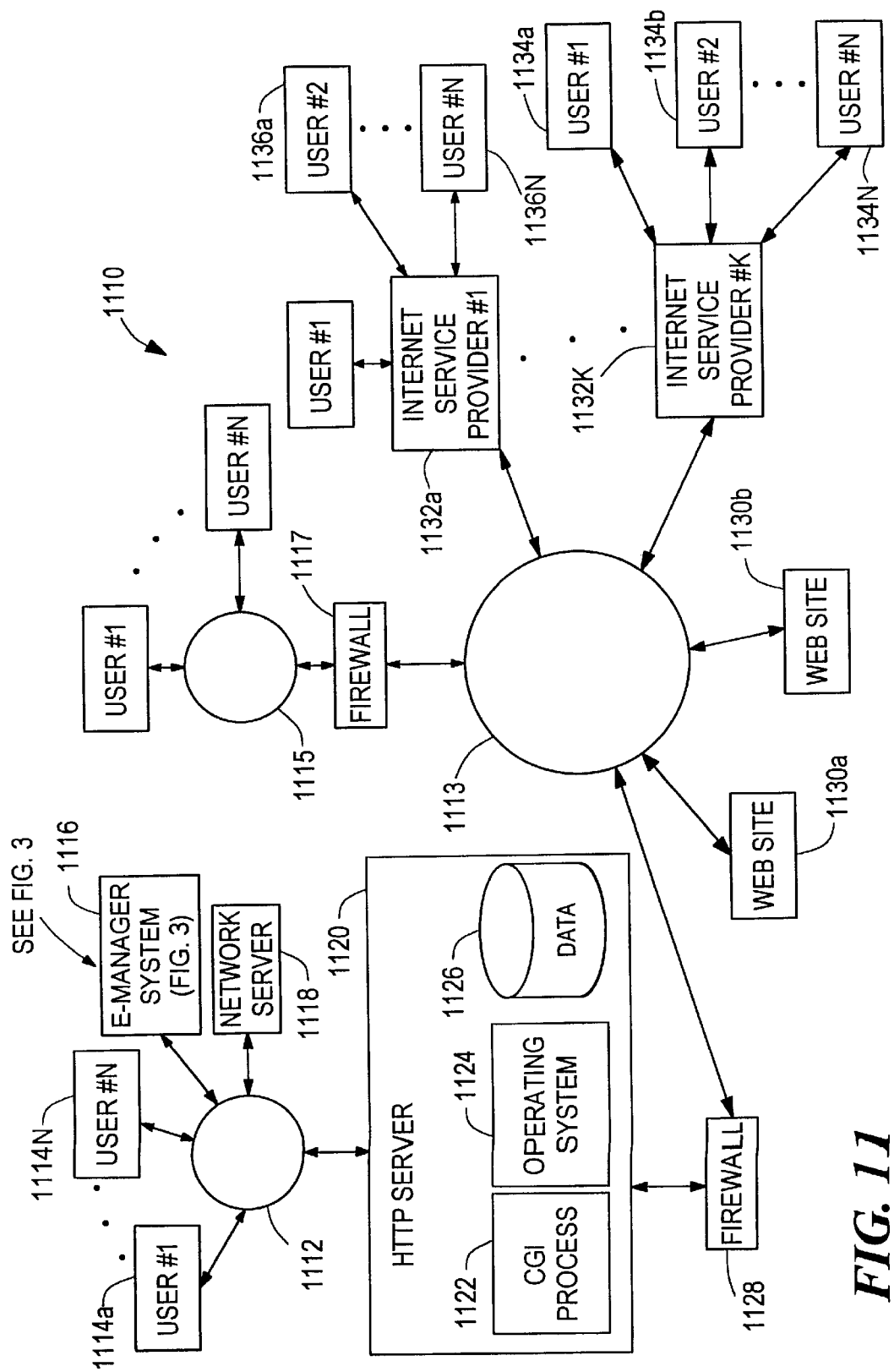
FIG. 11 is a block diagram of a system in which the entitlement system of the present invention can be utilized.

Referring now to FIG. 11, an exemplary network, or more particularly, Internet apparatus 1110 for providing an Entitlement manager system 1116 of the invention will now be described. One or more of a plurality of remote user terminals 1134a–1134N and 1136a–1136N generally denoted 1134, 1136 may access a local computer network 1112 by connecting the remote user's computer terminal 1134, 1136 to a computer network such as the Internet 1113. As used herein, the term "internet" generally refers to any collection of distinct networks working together to appear as a single network to a remote user. The term "Internet" on the other hand, refers to the so-called world wide "network of networks" that are connected to each other using the Internet protocol (IP) and other similar protocols. The Internet provides file transfer, remote log in, electronic mail, news and other services.

A remote user may connect a remote user terminal 1134, 1136 to the Internet 1113 in a variety of manners known in the art. A common method of making such a connection involves allowing the remote computer 1134, 1136 to communicate with an Internet Service Provider ("ISP") 1132 over telephone or other communication lines using a modem. The remote user then accesses services available on the Internet 1113 through the ISP's Internet communication facilities. Alternatively, users may be coupled to the Internet 1113 via a local area network 1115 and a firewall 1117.

A local computer network 1112 is also connected to the Internet through a firewall 1128 in one of the variety of manners known in the art. The local computer network 1112 includes at least one server computer such as a Hypertext Transfer Protocol (HTTP) server 1120 and a network server 1118. HTTP server 1120 and network server 1118 are coupled via network 1112. HTTP is a network protocol used for transmission of files and other data on the World Wide Web. Thus, HTTP servers are commonly referred to as Web servers.

Remote users may communicate with the HTTP server 1120 using a software application known in the art as a Web browser. A Web browser and Web server have a client-server type relationship. More specifically, a Web browser is an HTTP client which sends requests to an HTTP server. The HTTP server responds to the requests by transmitting to the HTTP client resources identified by the request. Resources may be located on the Internet 1113 using a Uniform Resource Locator ("URL"). Use of URL's is common in the art.

Resources that may be addressed over the Internet 1113 include Hypertext Markup Language ("HTML") files. HTML is a document description language that defines the various components of a World Wide Web page. World Wide Web pages often include text and graphics as well as "links" which allow a viewer of the page to address other resources on the Internet including other HTML pages.

Resources that may be addressed over the Internet 1113 also include software application programs. The Common Gateway Interface (CGI) is one standard for interfacing external software applications with information servers such as HTTP servers. A CGI program may be written in any programming language that may be executed on the computer network 1112. Suitable programming languages include C/C++, Fortran, PERL, TCL, any Unix shell, Visual Basic or Java.

The exemplary HTTP server 1120 executes one or more CGI programs 1122 resident therein. The CGI programs 1122 may be executed on an HTTP server 1120, or on a separate computer connected to HTTP server 1122 such as network server 1118. The CGI programs may access an operating system 1124 in order, for example, to access variables relating to the computing environment in which the CGI programs 1122 are executed.

Figure 11A:
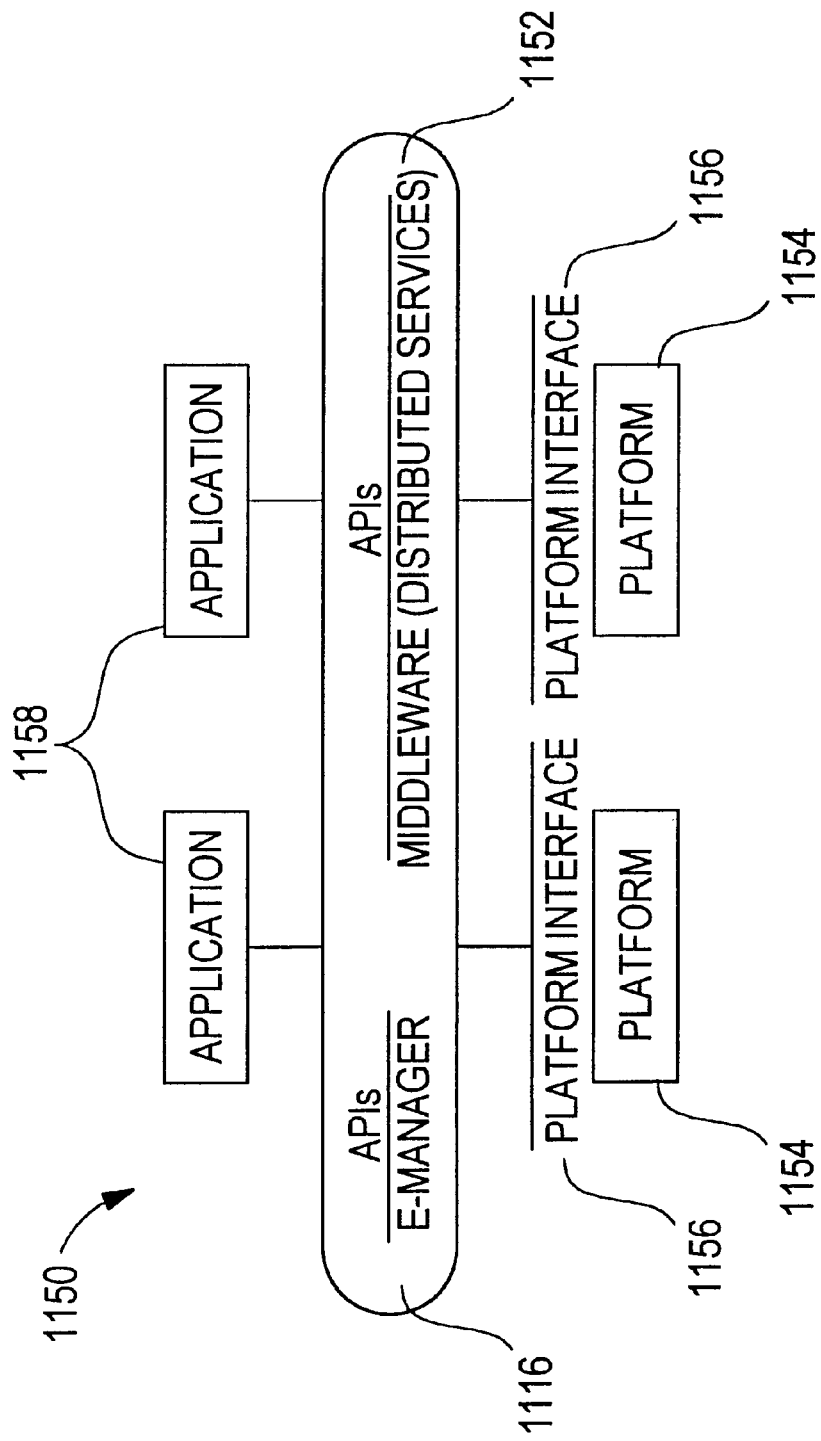
FIG. 11A is a block diagram of an additional system in which the entitlement system of the present invention can be utilized.

Before proceeding with a discussion of FIG. 11A, certain terminology is explained. The entitlement manager system of the invention may be implemented using "object-oriented" computer programming techniques. Object-oriented computer programming techniques involve the definition, creation, use and destruction of software entities referred to as "objects." Each object is an independent software entity comprised of data generally referred to as "attributes" and software routines generally referred to as "member functions" or "methods" or "logic" which manipulate the data.

One characteristic of an object is that only methods of that object can change the data contained in the object. The term "encapsulation" describes the concept of packaging the data and methods together in an object. Objects are thus said to encapsulate or hide the data and methods included as part of the object. Encapsulation protects an object's data from arbitrary and unintended use by other objects and therefore protects an object's data from corruption.

To write an object-oriented computer program, a computer programmer writes computer code that implements a pre-defined model of the system. The object-oriented computer code defines a set of "object classes" or more simply "classes." Each of these classes serves as a template which defines a data structure for holding the attributes and program instructions which perform the method of an object. Each class also includes a means for instantiating or creating an object from the class template. The means for creating is a method referred to as a "constructor." Similarly, each class also includes a means for destroying an object once it has been instantiated. The means for destroying is a method referred to as a "destructor."

When a processor of a computer executes an object-oriented computer program, the processor generates objects from the class information using the constructor methods. During program execution, one object is constructed, which object may then construct other objects which may, in turn, construct other objects. Thus, a collection of objects which are constructed from one or more classes form the executing computer program.

Object-oriented computer programming techniques allow computer programs to be constructed of objects that have a specified behavior. Several different objects can be combined in a particular manner to construct a computer program which performs a particular function or provides a particular result. Each of the objects can be built out of other objects that, in turn, can be built out of other objects. This resembles complex machinery being built out of assemblies, subassemblies and so on.

The term "client object," or more simply "client," refers to any object that uses the resources of another object which is typically referred to as the "server object" or "server." In one embodiment, the entitlement manager system of the invention can be implemented as one or more server objects which can be accessed by client objects seeking entitlement arbitration by the invocation of one or more entitlement manager methods. In addition, objects and some other software applications can communicate using a "publish/subscribe" protocol where an object publishes information, sometimes called an "event," that is received by all other objects that subscribe to that event. The entitlement manager system can control the broadcast of events by arbitrating the entitlement of objects to the event—that is, by determining which objects subscribe to the event.

The term "framework" can refer to a collection of inter-related classes that can provide a set of services (e.g., services for network communication) for a particular type of application program. Alternatively, a framework can refer to a set of interrelated classes that provide a set of services for a wide variety of application programs (e.g., foundation class libraries for providing a graphical user interface for a Windows system). A framework thus provides a plurality of individual classes and mechanisms which clients can use or adapt. In one embodiment, the system of the invention is supplied as a framework that can be tailored to the access control needs of a particular system.

An application framework refers to a set of classes which are typically compiled, linked and loaded with one particular application program and which are used by the particular application program to implement certain functions in the particular application program. A system framework, on the other hand, is provided as part of a computer operating system program. Thus, a system framework is not compiled, linked and loaded with one particular application program. Rather, a system framework provides a set of classes which are available to every application program being executed by the computer system which interacts with the computer operating system.

FIG. 11A illustrates a distributed software environment 1150 for providing network applications such as those provided by network 1112. Distributed software environment 1150 is based on middleware 1152 which connects a plurality of platforms 1154 (typically server machines) through platform interfaces 1156 to application 1158 which may consist of a number of software objects running on network 1112. Middleware 1152 is connectivity software that includes a set of enabling services that allow multiple processes running on one or more machines to interact across a network. Middleware 1152 is often used in enterprise software applications, especially when applications are being migrated from mainframe computers to client/server applications running on heterogeneous platforms. Common middleware 1152 embodiments include the Common Object Request Broker Architecture (CORBA) specification published by the Object Management Group and Microsoft's COM/DCOM. These middleware embodiments are known as Object Request Brokers (ORBs) and they are used to implement software environments having a distributed object architecture. When this type of system is used to power a World Wide Web site, it is often referred to as "webware."

The services provided by middleware 1152 include sets of distributed software that exist between application 1158 and the operating system and network services on a system node in a network. Middleware services provide a more functional set of Application Programming Interfaces (APIs) than most operating systems or network services and allow an application to locate transparently across a network, providing interaction with another application or service, be independent from network services, be reliable and available, and scale up in capacity without losing function. It is often desirable to provide applications for use on the Internet based on middleware to provide those applications with the availability and scalability that middleware allows. The entitlement manager 1116 or entitlements manager of the invention which provides software for enforcing access controls, may advantageously be provided as a portion of, or a plug-in to, middleware software for the purpose of providing entitlement manager functionality to an application (or to client processes) through one or more APIs.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

Having described preferred embodiments of the invention, one of ordinary skill in the art will now realize further features and advantages of the invention from the above-described embodiments. It should be understood, therefore, that the foregoing is only illustrative of the principles of the invention and that various modifications can be made by those skilled in the art without departing from the scope and spirit of the invention. Accordingly, the invention is not to be limited by what has been particularly shown and described, except as indicated by the appended claims.

What is claimed is:

1. In a system having a plurality of accessors and at least one resource, a method for determining accessor entitlement to a resource in response to an accessor request for access to the resource, comprising the steps of:
   a) associating with the resource an entitlement expression, the entitlement expression including a reference to at least one membership map having membership information for the accessor, the at least one membership map being a bit map;
   b) associating with the accessor a unique identifier, the unique identifier acting as an index into each membership map;
   c) evaluating the entitlement expression for the resource to determine the entitlement of the requesting accessor to the resource, the evaluation including looking up the accessor's membership information in the at least one membership map using the accessor's unique identifier.

2. The method of claim 1, wherein the system further comprises at least one group, each group having a name, zero or more accessors that are members of the group, and a membership map for determining whether a particular accessor is a member of the group, the entitlement expression referencing at least one membership map by including at least one group name corresponding to a group having a membership map.

3. The method of claim 2, wherein the entitlement expression comprises a plurality of group names and at least one operator.

4. The method of claim 3, wherein the entitlement expression operator comprises one or more boolean operators.

5. The method of claim 1, wherein the accessor's unique identifier is an index to a position in each bit map wherein the bit at that position indicates whether the accessor is a member of the group corresponding to the bit map.

6. The method of claim 1, wherein the bit map includes at least one bit for each accessor.

7. The method of claim 1, wherein the bit maps are stored in paged data structures.

8. In a system having a plurality of accessors, at least one group having a name and having zero or more accessors as members, and at least one resource, a method for determining accessor entitlement to a resource in response to an accessor request for access to the resource, comprising the steps of:
   a) associating with the resource an entitlement expression including at least one group name;
   b) associating with each group a membership map indicating whether particular accessors are members of that group, the membership map being a bit map;
   c) associating with each accessor a unique identifier usable as an index into each group membership map to determine whether that accessor is a member of that group;
   d) evaluating an entitlement expression for the resource to determine the entitlement of the requesting accessor to the requested resource.

9. The method of claim 8, wherein the accessor's unique identifier is an index to a position in each bit map wherein the bit at that position indicates whether the accessor is a member of the group corresponding to the bit map.

10. The method of claim 8, wherein the bit map includes at least one bit for each accessor.

11. The method of claim 8, wherein the bit maps are stored in paged data structures.

12. The method of claim 8, wherein each group name is associated with a membership map identifier that represents the location of the membership map for the group.

13. The method of claim 12, wherein the group names and the membership map identifiers associated with the group names are stored in an accessor group store.

14. The method of claim 13, wherein the membership map identifier is a number.

15. The method of claim 14, wherein an accessor group store bit map tracks which membership map identifier numbers are associated with group names and which membership map identifier numbers are available for association with a new group name.

16. The method of claim 8, wherein each accessor has a unique name and each accessor's name and unique identifier are stored in an accessor store.

17. The method of claim 16, wherein the accessor identifier is a number.

18. The method of claim 17, wherein an accessor store bit map tracks which identifier numbers are associated with accessors and which identifier numbers are available for association with a new accessor.

19. A system for determining accessor entitlement to a resource comprising:
   a) a first means for storing a plurality of accessors and a unique identifier associated with each accessor;
   b) a second means for storing a plurality of unique accessor group names, each of the plurality of accessor group names having an associated membership map, the accessor identifier acting as an index into the accessor group membership maps for determining whether an accessor is a member of an accessor group, the membership maps being bit maps; and
   c) a processor means for determining whether an accessor is entitled to a resource in response to an accessor request for the resource by evaluating an entitlement expression for the resource, the entitlement expression including a reference to at least one accessor group.

20. The system of claim 19, further comprising a third means for storing at least one unique resource name corresponding to a resource and an entitlement expression associated with each resource name.

21. The system of claim 19, wherein the processor means comprises a server process responsive to one or more client processes representing accessor requests for access to a resource.

22. The system of claim 21, wherein the processor means comprises a plurality of threads executing on a server computer for accessing the first and second means and for evaluating accessor entitlement requests based on information retrieved from the first and second means.

23. In a system having a plurality of accessors and at least one resource, a computer program product comprising a computer useable medium having computer readable program code to direct the system to perform a method for determining accessor entitlement to a resource in response to an accessor request for access to the resource comprising at least the following steps:
   a) associating with the resource an entitlement expression, the entitlement expression including a reference to at least one membership map having membership information for the accessory, the at least one membership map being a bit map;
   b) associating with the accessor a unique identifier, the unique identifier acting as an index into each membership map;
   c) evaluating the entitlement expression for the resource to determine the entitlement of the requesting accessor to the resource, the evaluation including looking up the accessor's membership information in the at least one membership map using the accessor's unique identifier.

24. The computer program product of claim 23, wherein the system further comprises at least one group, each group having a name, zero or more accessors that are members of the group, and a membership map for determining whether a particular accessor is a member of the group, the entitlement expression referencing at least one membership map by including at least one group name corresponding to a group having a membership map.

25. The computer program product of claim 24, wherein the entitlement expression comprises a plurality of group names and at least one operator.

26. The computer program product of claim 25, wherein the entitlement expression operator comprises one or more boolean operators.

27. The computer program product of claim 23, wherein the accessor's unique identifier is an index to a position in each bit map wherein the bit at that position indicates whether the accessor is a member of the group corresponding to the bit map.

28. The computer program product of claim 23, wherein the bit map includes at least one bit for each accessor.

29. The computer program product of claim 23, wherein the bit maps are stored in paged data structures.

30. In a system having a plurality of accessors, at least one group having a name and having zero or more accessors as members, and at least one resource, a method for determining accessor entitlement to a resource in response to an accessor request for access to the resource, comprising the steps of:
   a) associating with the resource an entitlement expression including at least one group name;
   b) associating with each group a membership map indicating whether particular accessors are members of that group;
   c) associating with each group name a membership map identifier that represents the location of the membership map for the group;
   d) associating with each accessor a unique identifier usable as an index into each group membership map to determine whether that accessor is a member of that group; and
   e) evaluating an entitlement expression for the resource to determine the entitlement of the requesting accessor to the requested resource.

31. The method of claim 30, wherein the group names and the membership map identifiers associated with the group names are stored in an accessor group store.

32. The method of claim 31, wherein the membership map identifier is a number.

33. The method of claim 32, wherein an accessor group store bit map tracks which membership map identifier numbers are associated with group names and which member ship map identifier numbers are available for association with a new group name.

34. In a system having a plurality of accessors, at least one group having a name and having zero or more accessors as members, and at least one resource, a method for determining accessor entitlement to a resource in response to an accessor request for access to the resource, comprising the steps of:
   a) associating with the resource an entitlement expression including at least one group name;
   b) associating with each group a membership map indicating whether particular accessors are members of that group;
   c) associating with each accessor a unique name and a unique identifier usable as an index into each group membership map to determine whether that accessor is a member of that group, each accessor's name and unique identifier being stored in an accessor store; and
   d) evaluating an entitlement expression for the resource to determine the entitlement of the requesting accessor to the requested resource.

35. The method of claim 34, wherein each accessor has a unique name and each accessor's name and unique identifier are stored in an accessor store.

36. The method of claim 34, wherein the accessor identifier is a number.

37. The method of claim 36, wherein an accessor store bit map tracks which identifier numbers are associated with accessors and which identifier numbers are available for association with a new accessor.

* * * * *